1,710,412

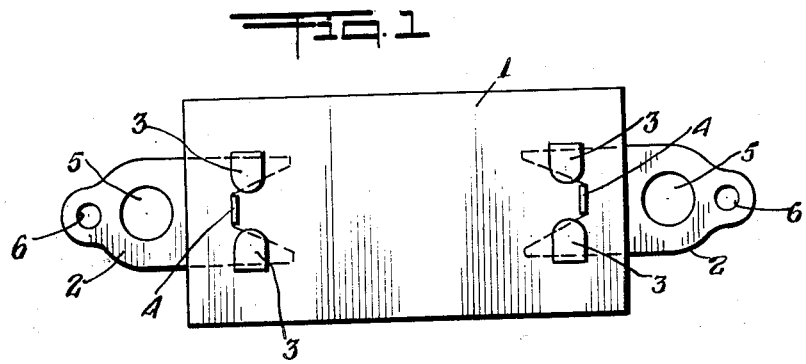
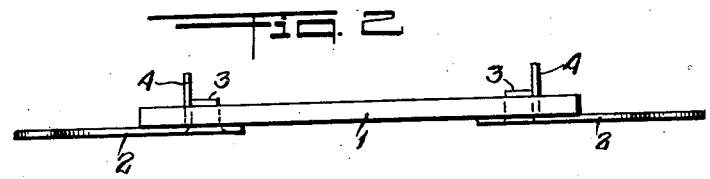
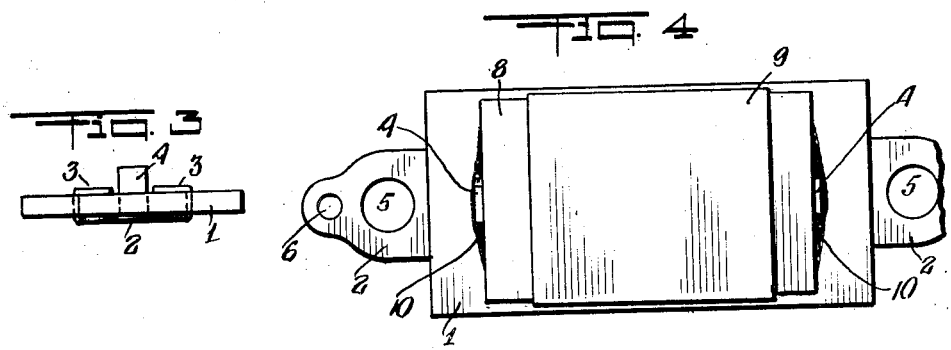
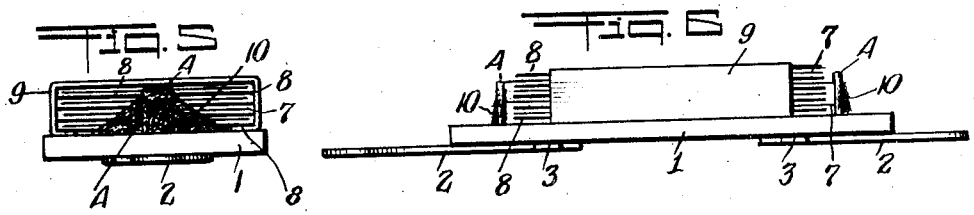
INVENTOR
William Dubilier
BY
William F. Nickel
ATTORNEY April 23, 1929.   W. DUBILIER   1,710,412
ELECTRICAL CONDENSER
Filed Nov. 30, 1925   2 Sheets-Sheet 2
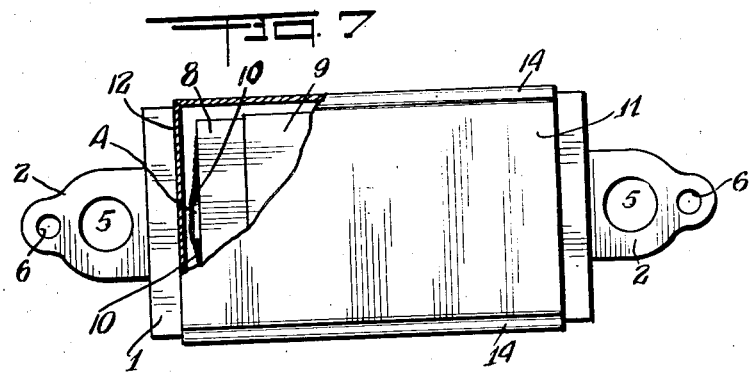
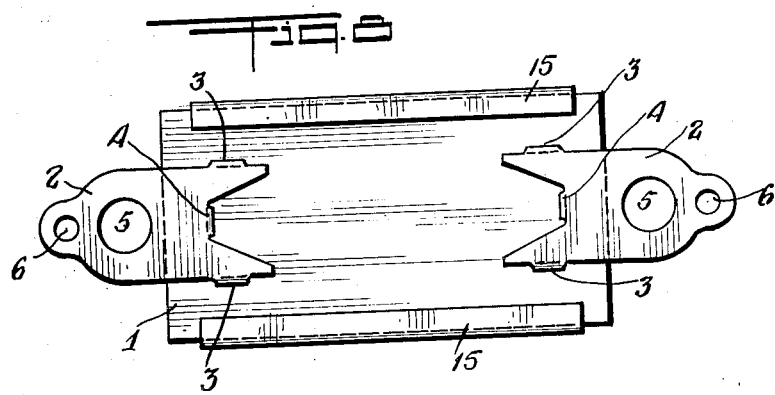
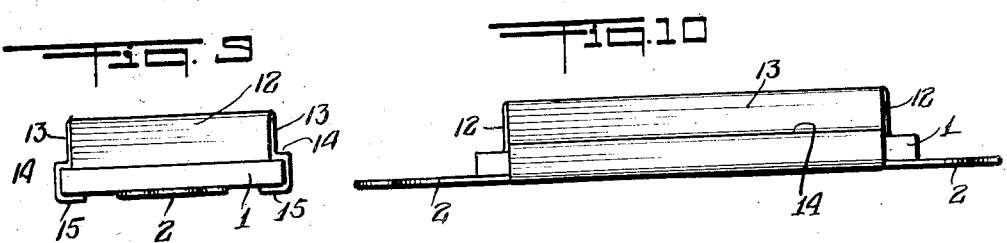
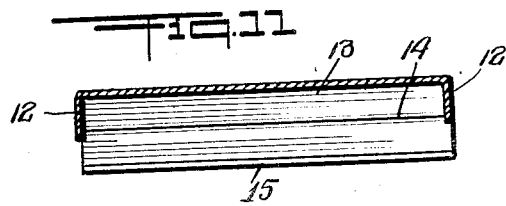
INVENTOR
William Dubilier
BY
William F. Nickel
ATTORNEY Patented Apr. 23, 1929.

UNITED STATES PATENT OFFICE.

WILLIAM DUBILIER, OF NEW ROCHELLE, NEW YORK, ASSIGNOR TO DUBILIER CONDENSER CORPORATION, OF NEW YORK, N. Y., A CORPORATION OF DELAWARE.

ELECTRICAL CONDENSER.

Application filed November 30, 1925. Serial No. 72,302.

My invention relates to an improved electrical condenser of fixed capacity, and an object of the invention is to provide a condenser which is suitably mounted for handling, well-housed in a protective covering, and equipped with convenient terminals to enable it to be connected to an electric circuit in which it is to operate.

The nature and advantages of the invention will appear from the following description, taken with the accompanying drawings; but this disclosure is illustrative only, and I may resort to changes within the scope and spirit of the invention, to the full extent indicated by the broad and general meanings of the terms of the appended claims.

On the drawings, which show a preferred embodiment of my invention,

Figures 1, 2 and 3 are respectively a top, side and end view of a base or mounting plate, with terminals, for my condenser;

Figures 4, 5 and 6 are respectively a top, end and side view of said plate with the body of the condenser secured to the plate;

Figures 7, 8, 9 and 10 are respectively a top, bottom, end and side view of the condenser, when finished, with its protective casing in place; and Figure 11 is a longitudinal section through said casing.

The same numerals identify the same parts throughout.

My condenser comprises a base or mounting plate 1, to one face of which at the opposite ends, are affixed terminals 2, in the form of metal tabs which are provided with tongues or projections 3 that pass through the plate and are bent down against the opposite surface thereof; to secure the terminals and the plate together; each terminal also has a tab 4 which extends through the plate 1 adjacent the terminals 3 for a purpose mentioned below. Preferably, the tabs 2 have perforations 5 and 6 to facilitate the attachment of a wire or conductor to enable the condenser to be connected in an electric circuit.

On the other face of the plate opposite to that upon which the tabs 2 are affixed, I dispose the body or stack of the condenser which comprises electrically conductive elements, such as sheets of metal foil 7 separated by insulation in the form of mica or other sheets 8. The stack may be encircled by a clamping member 9 to hold the sheets of tin-foil and mica together, and this stack may be compressed by applying pressure thereto, with the clamp 9 encircling it, and it may be evacuated and impregnated with wax or some other insulation if desired. Part of the conductive elements 7 project from the stack at one end, and part project from the stack at the other end and the projecting ends of the elements 7 are united to the upstanding projections 4, so as to afford a good connection between the elements 7 of opposite polarity, and the terminals 2. If desired, the ends of the elements 7 of opposite polarity may be united to the lugs or projections 4 by means of solder indicated at 10, thus not only connecting the stack to the two terminals 2, but also making the stack fast on the plate 1.

When the stack is disposed upon the upper face of the plate 1 in this manner, the condenser is finished by putting on a protective casing 11 which may be of metal. The top of this casing lies upon the top of the clamp 9 and the ends of this casing 12 are turned down to cover the ends of the stack and the lower edges of these ends will rest upon the face of the plate 1. The sides 13 also of the casing 11 are turned down against the sides of the stack and then bent outward forming a shoulder 14, along each side of the plate 1, and the lower edges of the sides 13 are bent over into tight contact with the bottom face of the plate 1. The covering or casing 11 is thus securely attached to the plate, gripping it along its opposite side edges between the shoulders 14 and edges 15, and the stack is thus well housed and protected against injury.

My improved condenser is thus seen to be quite simple in construction, is permanently mounted upon a supporting or base plate 1 which has permanent terminals 2 secured to it; while the clamp 9 holds the sheets of foil and mica together and the covering 11 prevents damage in practice. The condenser is, therefore, very strong and durable; can be connected very readily into circuit, and will stand much handling without any impairment of function.

Having described my invention, what I believe to be new and desire to secure and protect by Letters Patent of the United States is:

1. A condenser comprising a mounting plate, terminals affixed to one face of said plate, electrically conductive elements insulated from one another disposed on the opposite face of the plate and connected part to one of said terminals and part to the other on said opposite face of the plate, and a protective covering for said elements, extending over the edges of said plate.

2. A condenser comprising a mounting plate, terminals secured to one face of the plate, electrically conductive elements disposed on the opposite face of the plate and connected part to one terminal and part to the other on said opposite face of the plate, a clamping member encircling said elements, and a protective cover for said elements secured to said plate, and extended over the edges of said plate.

3. A condenser comprising a mounting plate, terminals on one face of said plate at the opposite ends thereof, said terminals having projections which pass through the plate to affix the terminals thereto, and electrically conductive elements disposed upon the opposite face of the plate, said terminals having additional projections which pass through the plate adjacent the ends thereof, to enable said elements to be connected to said terminals.

4. An electrical condenser comprising a mounting plate, terminals attached to the plate, electrically conductive elements insulated from one another disposed on said mounting plate, and a covering for said elements, the edges of said covering engaging the face of the plate to secure the covering to the plate, and hold the covering in place.

5. A condenser comprising a mounting plate, terminals affixed to said plate, electrically conductive elements insulated from one another on said plate, a covering having its sides and ends bent down against one surface of the plate, and the edges along its opposite sides bent over into engagement with the opposite surface of said plate to secure said covering in position.

6. An electrical condenser comprising a mounting plate, terminals disposed against one face of the plate at the opposite ends thereof, said terminals each having projections passing through the plate to secure the terminals in place, electrically conductive elements insulated from one another disposed on the opposite face of the plate, said terminals also having additional projections passing through the plate to be connected to conductive elements of opposite polarity, a clamp encircling said elements, and a protective covering for said elements, the covering having its sides and ends bent down against the face of the plate bearing said elements, and the edges of its opposite sides bent over into engagement with the opposite face of said plate to secure the covering thereto.

7. A condenser comprising conductive elements, a mounting plate, terminals affixed to one face of said plate, and projections on said terminals penetrating said mounting plate, said terminals projecting beyond the mounting plates and said projections being connected to said conductive elements.

In testimony whereof I affix my signature.

WILLIAM DUBILIER.